United States Patent
Takamiya et al.

(10) Patent No.: US 8,643,869 B2
(45) Date of Patent: Feb. 4, 2014

(54) PRINTING OF COLOR PRINT DATA AS COLOR IMAGE OR AS BLACK-AND-WHITE IMAGE

(75) Inventors: Yuichi Takamiya, West Caldwell, NJ (US); Larry K. Long, Lawrenceville, GA (US)

(73) Assignee: Ricoh Company, Ltd., Tokyo (JP)

( * ) Notice: Subject to any disclaimer, the term of this patent is extended or adjusted under 35 U.S.C. 154(b) by 982 days.

(21) Appl. No.: 12/042,685

(22) Filed: Mar. 5, 2008

(65) Prior Publication Data

US 2009/0225334 A1 Sep. 10, 2009

(51) Int. Cl.
*G06F 3/12* (2006.01)

(52) U.S. Cl.
USPC ......... 358/1.15; 358/1.1; 358/1.13; 358/1.14; 358/2.1; 358/3.27; 715/200; 715/212; 715/227; 715/700; 382/162; 705/27.1; 705/27.2; 705/400; 705/1.1; 705/7.37

(58) Field of Classification Search
USPC ............... 358/1.15, 1.13, 1.14, 1.1, 2.1, 3.27
See application file for complete search history.

(56) References Cited

U.S. PATENT DOCUMENTS

| | | | |
|---|---|---|---|
| 5,636,032 A | 6/1997 | Springett | |
| 5,664,110 A * | 9/1997 | Green et al. | 705/27.2 |
| 2002/0165833 A1 * | 11/2002 | Minowa et al. | 705/400 |
| 2004/0080789 A1 * | 4/2004 | Anderson | 358/2.1 |
| 2005/0151992 A1 | 7/2005 | Shaw et al. | |
| 2006/0238790 A1 * | 10/2006 | Chapman | 358/1.13 |
| 2007/0182984 A1 * | 8/2007 | Ragnet et al. | 358/1.15 |
| 2008/0080711 A1 * | 4/2008 | Gagnon et al. | 380/239 |
| 2008/0189598 A1 * | 8/2008 | Yoshida | 715/227 |

FOREIGN PATENT DOCUMENTS

| | | |
|---|---|---|
| JP | 2002-179268 | 6/2002 |
| JP | 2002-268861 | 9/2002 |
| JP | 2003-223296 | 8/2003 |
| JP | 2005-309493 | 11/2005 |

OTHER PUBLICATIONS

"Pharos iMFP for Canon" http://www.pharos.com/Documents/Office/OF-iMFP-Canon.pdf.
"Pharos iMFP for Hewlett-Packard" http://www.pharos.com/Documents/Office/OF-iMFP-HP.pdf.
"Pharos iMFP for Lexmark" http://www.pharos.comlDocuments/Office/OF-iMFP-Lexmark.pdf.
"Campus*Card* Direct" User Guide.
Japanese official action dated Dec. 18, 2012 in connection with corresponding Japanese patent application No. 2009-051354.

* cited by examiner

*Primary Examiner* — Paul F Payer
(74) *Attorney, Agent, or Firm* — Cooper & Dunham LLP

(57) ABSTRACT

System, apparatus and method for printing color image print data selectably as a color image or as a black-and-white image are described.

20 Claims, 20 Drawing Sheets

| | Job Name | Pages | Color type | Cost |
|---|---|---|---|---|
| | ☐ IS241.pdf | 0006 | Color | $6.00 |
| | ☐ Alternate | | B/W | $3.00 |
| | ☐ Budget.xls | 0015 | B/W | $7.50 |
| User ID  L Long | ■ abcd.doc | 0100 | Color | $100.00 |
| | ☐ Alternate | | B/W | $50.00 |
| Total  2 Jobs | ■ xyz01.pdf | 0277 | B/W | $138.50 |
| | Amount | 0377 | | $238.50 |
| Your Remain | | | | |
| $200.00 | | Print | | Cancel |

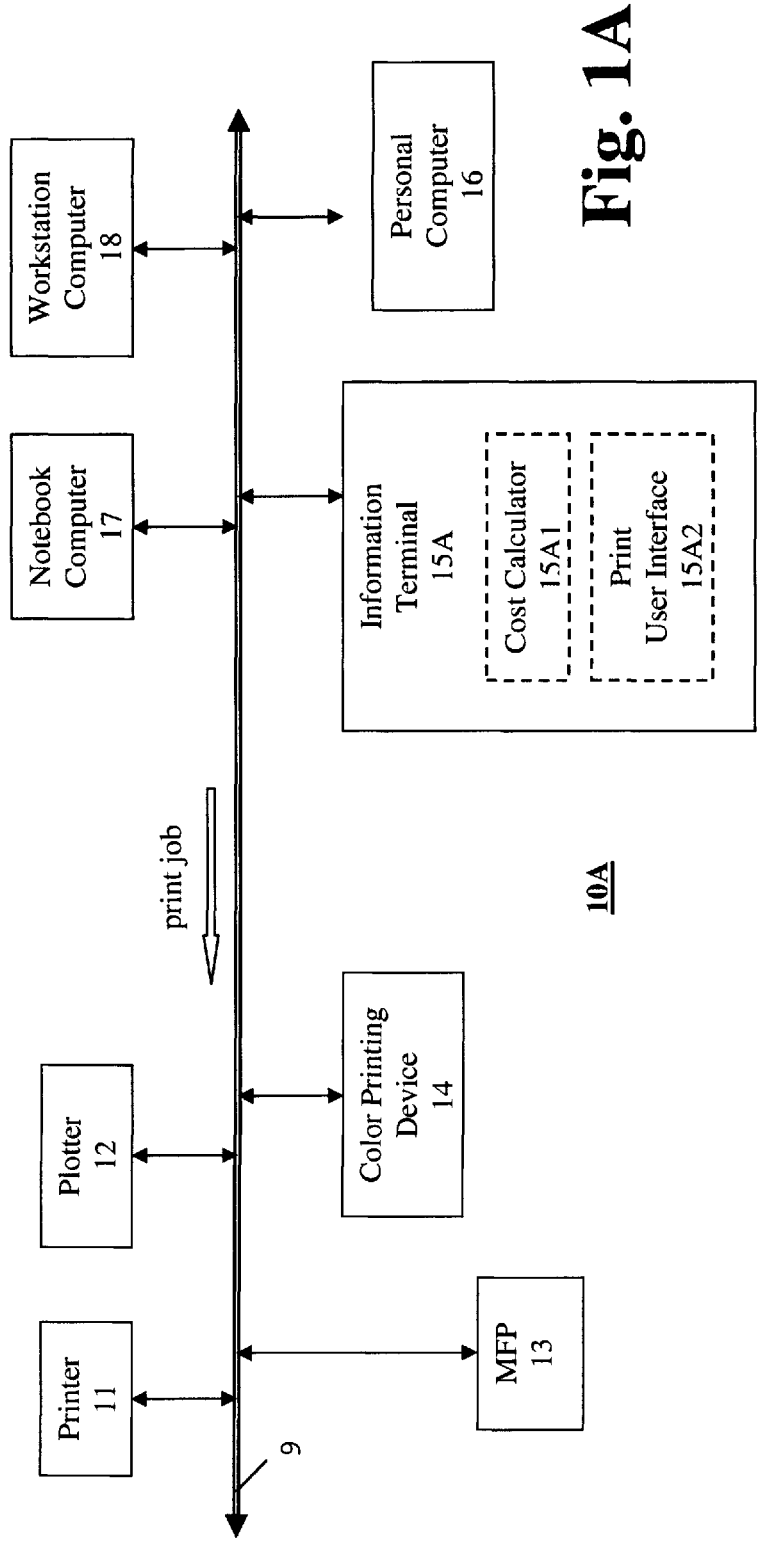

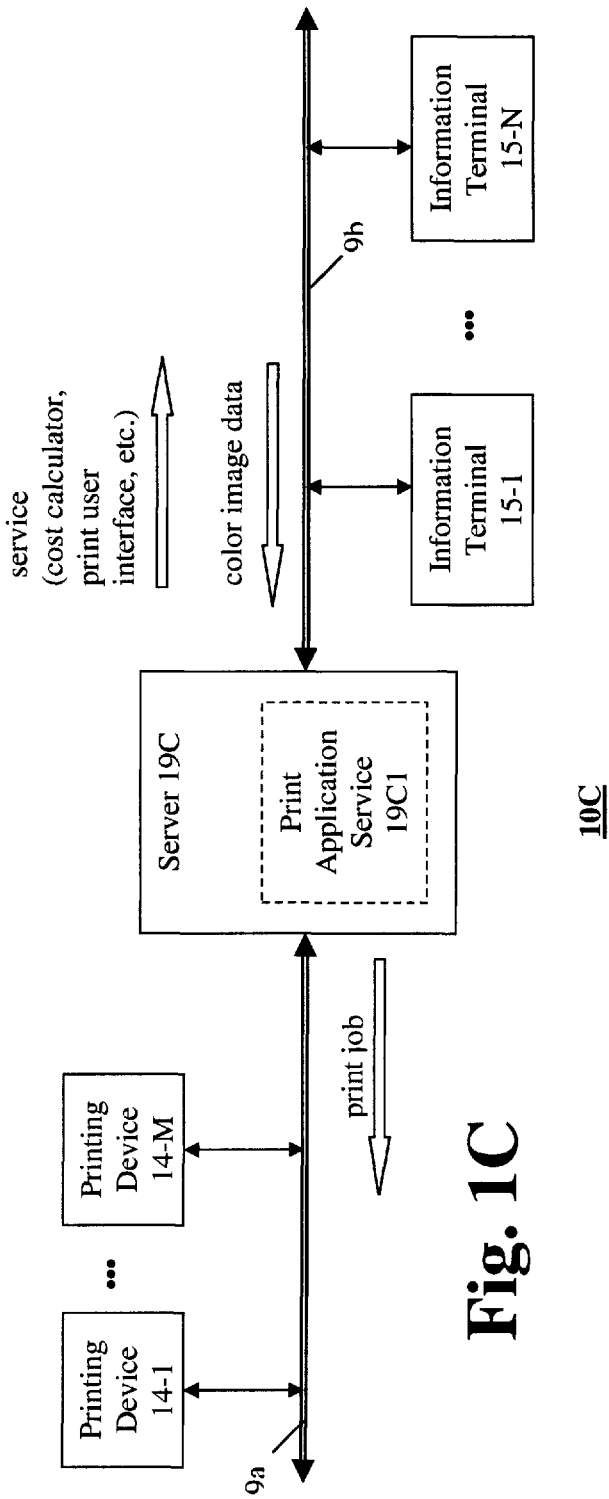

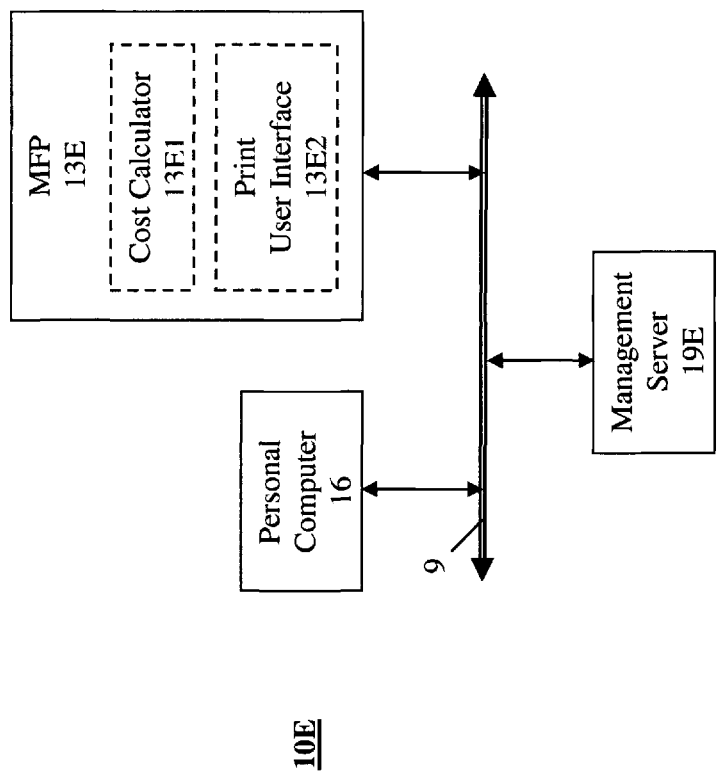

Fig. 5

| User ID | User Name | Password |
|---|---|---|
| L Long | Larry Long | XXXXX |
| Y Takamiya | Yuichi Takamiya | YYYYY |
| | | |

User Management Table

Fig. 6

| User ID | Account Remaining |
|---|---|
| L Long | $200.00 |
| Y Takamiya | $135.50 |
| | |

Account Management Table

Fig. 7

| Color Type | Cost per page |
|---|---|
| Color | $1.00 |
| B/W | $0.50 |

Cost Information Table

| | Job Name | Pages | Color type | Cost |
|---|---|---|---|---|
| User ID  L Long<br>Total  2 Jobs<br><br>Your Remain<br>$200.00 | ☐ IS241 pdf | 0006 | Color | $6 00 |
| | ☐ *Alternate* | | *B/W* | *$3 00* |
| | ☐ Budget xls | 0015 | B/W | $7 50 |
| | ■ abcd.doc | 0100 | Color | $100 00 |
| | ☐ *Alternate* | | *B W* | *$50 00* |
| | ■ xyz01 pdf | 0277 | B/W | $138 50 |
| | Amount | 0377 | $238.50 | |
| | | Print | | Cancel |

Fig. 19

| | Job Name | Pages | Color type | Cost |
|---|---|---|---|---|
| User ID  L Long<br>Total  2 Jobs<br><br>Your Remain<br>$200.00 | ☐ IS241 pdf | 0006 | Color | $6 00 |
| | ☐ *Alternate* | | *B/W* | *$3 00* |
| | ☐ Budget xls | 0015 | B/W | $7 50 |
| | ☐ abcd doc | 0100 | Color | $100 00 |
| | ■ *Alternate* | | *B/W* | *$50 00* |
| | ■ xyz01 pdf | 0277 | B W | $138 50 |
| | Amount | 0377 | $188.50 | |
| | | Print | | Cancel |

Fig. 20

PRINTING OF COLOR PRINT DATA AS COLOR IMAGE OR AS BLACK-AND-WHITE IMAGE

TECHNICAL FIELD

This disclosure relates to printing when print data is for a color image. In particular, the disclosure relates to a system, apparatus and method which enables a user to select whether such color image will be printed as a color image or as a black-and-white image.

BACKGROUND

In the current information age, there are often discussions of the desirableness of a paperless society. However, notwithstanding such discussions, there remains a great need by users of computers and other information terminals (that is, any of the various conventional devices which have a need to print on demand, such as personal computers, notebook computers, workstations, other types of computers, kiosks, PDAs, other information appliances, etc.) for printing functionality. Therefore, devices having printing or plotting functionality, such as printers, copiers, multi-function devices, etc., continue to play a significant role in information technology (IT) at home and at work. The terms "printer" and "printing device" are used hereinafter generically to include any output device having a printing or plotting functionality, and include multi-function devices having a copy and/or scanning functionality in addition to the printing or plotting functionality.

Information, transmitted or stored in an electronic form, is often in a multi-media form, in order to facilitate presentation. In the case of images (for example, video, graphics, etc.), with or without text, such images are often transmitted or stored in the form of color image data. When such image is printed, it is generally desirable to print the image as a color image. However, in many instances, the cost of color printing is higher than the cost of black-and-white printing, and/or color printing resources are less available than black-and-white printing resources.

While some organizations charge each user (or a department within the organization of the user) for use of IT (information technology) resources, such as a per-page or per-job printing charge, the user may or may not be aware generally of such charges. In any event, any such general awareness, by itself, would unlikely lead the user to consider such costs before using color printing resources. In the interest of optimal use of color printing resources and cost containment, it is desirable to resort to color printing only when color image output is cost efficient.

There is a need for techniques for presenting cost information to a user before the user prints an image as a color image.

BRIEF SUMMARY

This disclosure describes methods, apparatuses and systems for submitting a print job, based on color image print data, to a specific printing device.

In an aspect of this disclosure, a system can be provided with capabilities to calculate the costs of printing a print job, based on the color image print data as a color image and as a black-and-white image, respectively, and present the costs to the user for selection. Upon selection of one of the costs, the print data is processed for printing as a color image or as a black-and-white image, corresponding to the user selection of one of the presented costs.

Further, the subject matter of this disclosure also can include providing capabilities to the user to specify options to be applied to a print job.

In one exemplary embodiment of the disclosure, an apparatus and/or method (for example implemented on one or more information terminals configured through an appropriate program of instructions, to print to a selected printer in a printing system) for submitting a print job to a specific printer is configured to (i) calculate a cost of printing specific print data as a color image and a cost of printing the print data as a black-and-white image, (ii) display the calculated costs calculated in (i), for selection by user, and (iii) print the print data as a color image or as a black-and-white image, corresponding to the cost selected by the user in (ii).

For example, such features, in whole or in part, may be implemented as a print application provided through a network to an information terminal enabling a user to print a print job on a specific printer, without using a printer driver.

BRIEF DESCRIPTION OF THE DRAWINGS

The features of the subject matter of this disclosure can be more readily understood from the following detailed description with reference to the accompanying drawings wherein:

FIG. 1A shows a block diagram illustrating a printing system in accordance with a first exemplary embodiment of the subject matter of this disclosure;

FIG. 1C shows a block diagram illustrating a system in accordance with a third exemplary embodiment;

FIG. 1E shows a block diagram illustrating a system in accordance with a fifth exemplary embodiment;

FIG. 5 shows a graphical representation of an example of a user management table maintained by the multi-function device of FIG. 2;

FIG. 6 shows a graphical representation of an example of an account management table maintained by the management server of FIG. 4;

FIG. 7 shows a graphical representation of an example of a cost information table;

FIGS. 19 and 20 show respective examples of user interface screens displayed in the process of FIG. 18 to show costs of stored print jobs.

DETAILED DESCRIPTION OF EXEMPLARY EMBODIMENTS

Figure 1B:
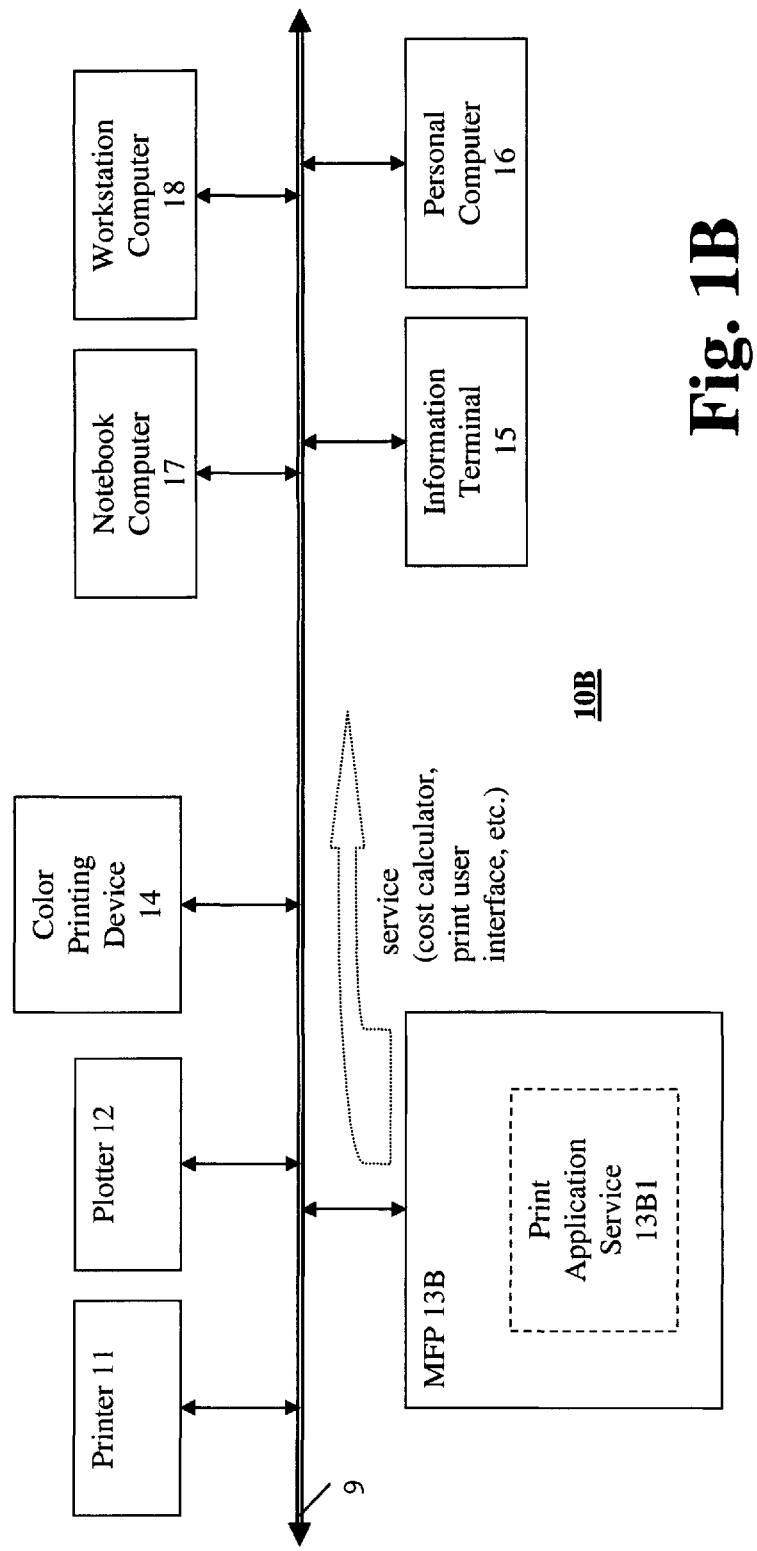
FIG. 1B shows a block diagram illustrating a system in accordance with a second exemplary embodiment.

In describing exemplary embodiments illustrated in the drawings, specific terminology is employed for the sake of clarity. However, the subject matter of this patent specification is not intended to be limited to the specific terminology so selected and it is to be understood that each specific element includes all technical equivalents that operate in a similar manner.

This patent specification describes tools (in the form of methods, apparatuses and systems) for submitting a print job comprising color image print data, from any platform to any printing device. Such tools provide a cost calculator for calculating (a) a cost of printing specific color image print data as a color image and (b) a cost of printing the print data as a black-and-white image, and a print user interface for displaying such calculated costs, for selection by the user. The print data is printed as a color image or a black-and-white image, in accordance with user selection of one of the displayed costs.

The drawings show examples of implementations of the subject matter of this patent disclosure in several computing environments. However, it should be understood that the subject matter of this disclosure can be utilized by any computing device including but not limited to PDAs, cell phones, personal, notebook and workstation computers, kiosks, other information terminals, etc. In addition, the subject matter of this disclosure might be provided as services in a modular fashion by other devices connected by a communication network.

A first exemplary embodiment in which the subject matter of this disclosure is embodied in a print driver installed on a computing device will be described below with reference to FIG. 1A.

FIG. 1A shows a printing system 10A comprised of a plurality of printing devices, including printer 11, plotter 12, MFP (multi-function peripheral) device 13 and other color printing device 14, and a plurality of information terminals or computing devices, including information terminal 15A, personal computer 16, notebook computer 17 and workstation 18, all interconnected through a network 9. The network 9 can be any type of wired or wireless network, such as a local area network, a wide area network, an intranet, an extranet, the Internet, etc., or a combination thereof.

The information terminal 15A is shown in FIG. 1A to include a cost calculator 15A1 and a print user interface 15A2 (discussed below). However, any of the information terminals connected to the network 9 can be configured in such a manner, such as via a print driver.

FIG. 1B shows a system 10B, in accordance with a second exemplary embodiment, comprised of a plurality of printing devices, including MFP 13B, and a plurality of information terminals, interconnected through network 9. In the embodiment shown in FIG. 1B, a print application service 13B1 is supplied as a service by the MFP 13B, to any computing device capable of communicating with the MFP 13B and the service component 13B1.

The service component 13B1 can announce itself on the network 9 and describe the MFP and its capabilities to the user. The print application provided by the service component 13B1 of the MFP 13B as a service to the information terminals can include a cost calculator and a print user interface, similar to the print driver residing natively on the information terminal 15A (FIG. 1A), except that the cost calculator and print user interface are supplied to a networked information terminal in a print application.

While FIG. 1B shows the print application service being available from the MFP 13B, each or any printing device connected to the network 9 can be configured to host a service component similar to service component 13B1, to provide print application service to the information terminals connected to the network.

Each information terminal may be configured (such as through a print driver or application) to have a plurality of print modes, such as PDL mode, image mode, etc. In the PDL mode, the sending host terminal communicates a print job to the printing device by utilizing a page description language (PDL) (for example, PostScript, etc.) and including one or more commands (for example, PCL, PJL, etc.), in a format which can be processed by the printing device. In image mode, the information terminal converts the print job into bitmap data and transmits the bitmap data to the printer device. In any event, the print job is communicated from the information terminal via one or more packets through the network. Each packet includes in its header the network address (for example, IP address, Mac address, etc.) of the sending information terminal.

A third exemplary embodiment in which the print application is provided to a computing device by a server hosting the print application service is described below.

FIG. 1C shows a system 10C comprised of a plurality of printing devices (14-1 through 14-M) and a plurality of information terminals (15-1 through 15-N). The printing devices 14-1 through 14-M are connected to server 19C through network 9a, and the information terminals 15-1 through 15-N through the network 9b. The network 9a and the network 9b may be the same network, interconnected networks, or unconnected networks. The server 19C hosts a service of providing a print application service 19C1 to the information terminals 15-1 through 15-N, and announces the print application service on the network 9b.

Hosting the print application 19C1 as a service on a server enables any information terminal or computing device that can communicate with the server 19C to submit a print job to any printing device with which the server can communicate. For example, the server 19C may be a combination of a print server and a web server and enables users to obtain printing services through the Internet. Accordingly, the information terminal or computing device can submit print job files to a printing device with which the information terminal or computing device cannot communicate directly.

The print application service 19C1 provided by the server 19C to the information terminal or computing device can include a cost calculator and a print user interface, and enables the user to submit a print job. Submission methods include, but are not limited to, HTTP, HTTPS, FTP, FTP secure, SSH file transfer, etc. The server in turn can submit the print job to the printing device by any of the transport methods supported by the printer, including, but not limited to, TCP/IP Socket, LPR, IPP, IPP secure, HTTP, HTTP secure, FTP, FTP secure, SSH file transfer, etc.

Figure 1D:
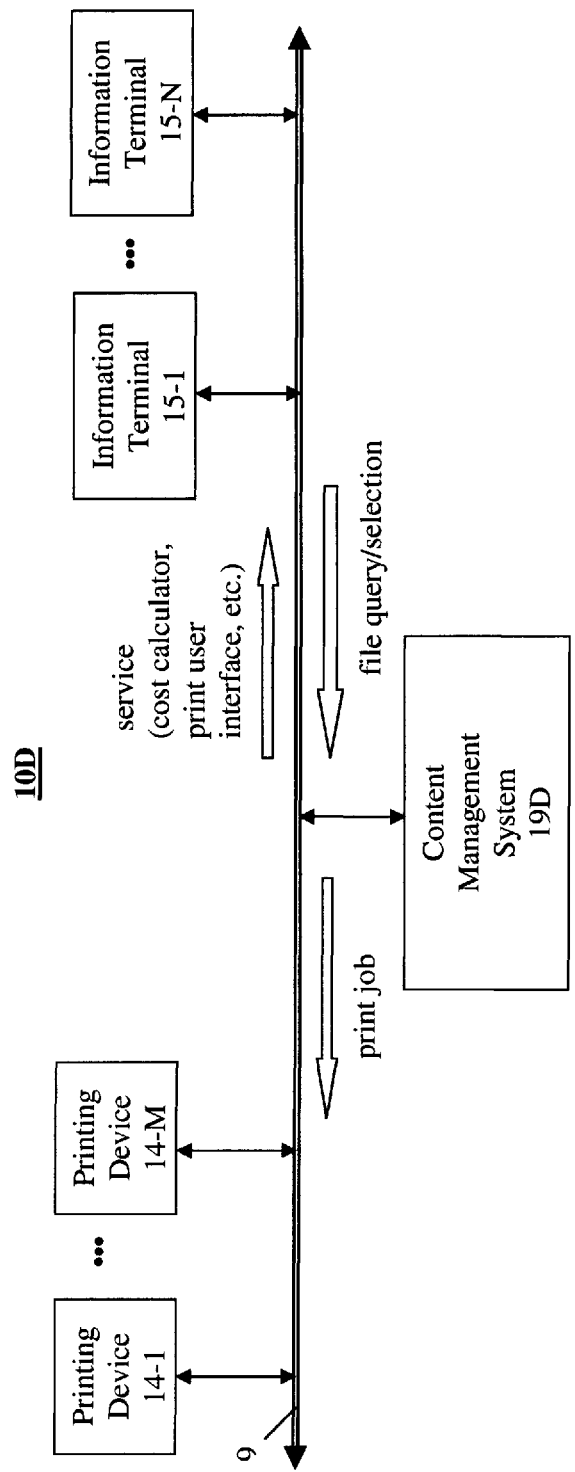
FIG. 1D shows a block diagram illustrating a system in accordance with a fourth exemplary embodiment.

FIG. 1D shows a system 10D, in accordance with a fourth embodiment, comprised of a plurality of printing devices (14-1 through 14-M), a plurality of information terminals (15-1 through 15-N), a computing device or system 19D that stores and manages the job files and/or other content. The user can interact with the system 10D through, for example, a web interface or a file browser at a printing device. Any printing device that can host such a file browser interface can be used.

In another example, a web interface can be provided at an information terminal, through a web browser, with a thin client being provided through the browser to the user. Thus, virtually any terminal device with a browser can request printing of a document, stored in the content system 19D, and the terminal need not be a personal (or notebook or workstation) computer to access the content system. A print application service, including cost calculator and print user interface, can be supplied to the information terminal by a printing device (similar to the embodiment of FIG. 1B) or by the content system 19D.

Another exemplary embodiment is shown in FIG. 1E. System 10E is shown in FIG. 1E with MFP 13E and personal computer 16, and in addition, an account (or management) server 19E. As should be understood, the system 10E, like systems 10A-10D, can include one or multiple printing devices and one or multiple information terminals.

The MFP 13E is a multi-function device (such as with scanner, printer, digital copier, and image processing functions) and in addition can be utilized as a terminal to communicate with the management server 19E or another database. In addition, a cost calculator 13E1 and a print user interface 13E2 are provided via appropriate programming on the MFP 13E.

Figure 2:
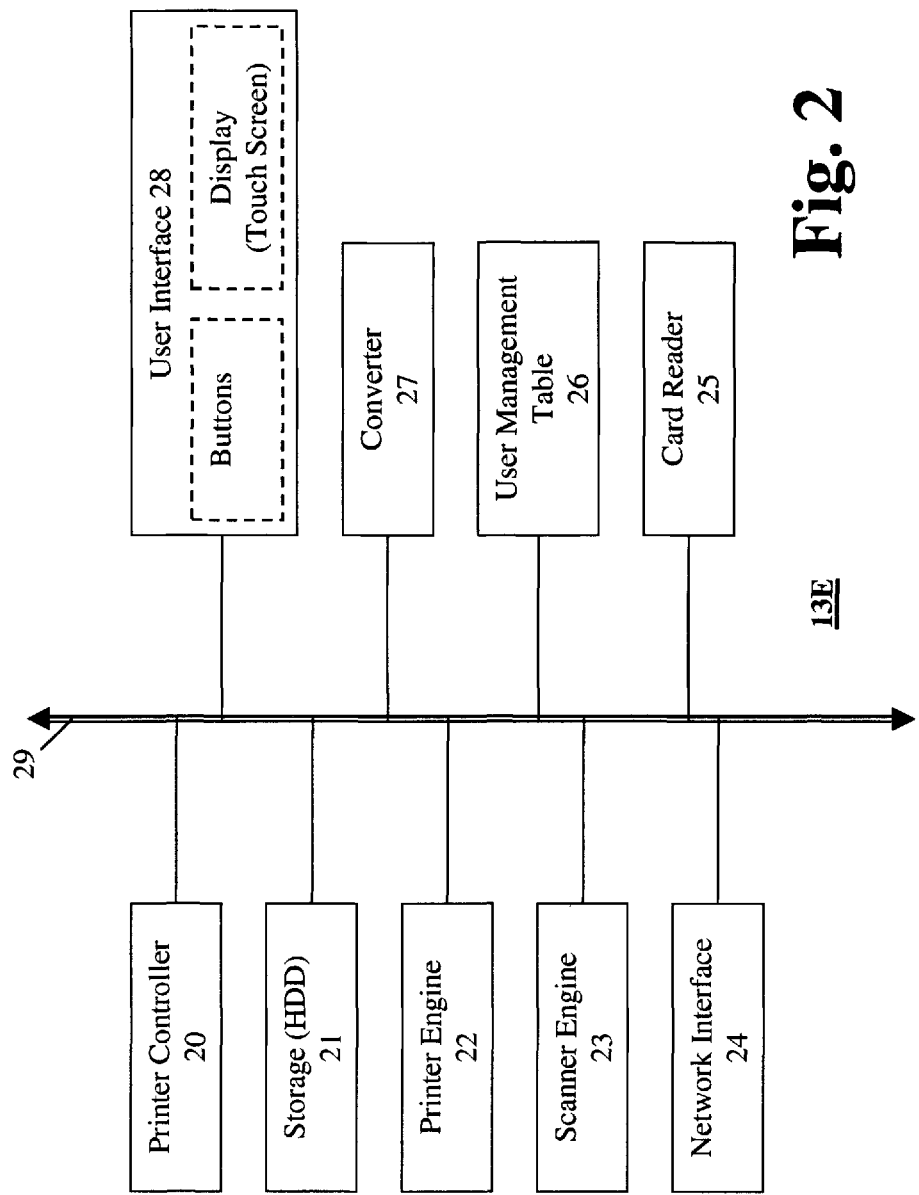
FIG. 2 shows a block diagram illustrating an example of a multi-function device, such as can be used in the system of FIG. 1E.

An example of a multi-function device that can be used as the MFP 13E is shown in FIG. 2. The MFP 13E can include a printer controller 20, and various elements connected to the controller 20 by an internal bus 29. The controller 20 controls and monitors operations of the MFP 13E. The elements connected to the controller 20 include storage 21 (for example, random access memory, read-only memory, hard disk drive, portable storage media drive such as for optical discs, magnetic discs, magneto-optical discs, etc., semiconductor memory cards, combinations of storage media, etc.), printer engine 22, scanner engine 23, network interface (I/F) 24, card reader 25, converter 27 for converting data from one format to another format (for example, a format suitable for printing by the print engine), and user interface 28. The controller 20 also utilizes information stored in user management table 26 (for example, as shown in FIG. 5) to authenticate and control user access to the functionalities of the MFP (discussed below).

Program code instructions for the MFP 13E can be stored in storage 21 and executed by the controller 20 to carry out the instructions. Such instructions can include instructions for performing specified functions (such as printing, scanning and copying) of the MFP, to enable the MFP to interact with the personal computer 16 and the management server 19E (as well as perhaps other external devices) through the network interface 24, and to control the card reader 25, the converter 27, access to data in the user management table 26, and interactions with users through the user interface 28.

The user interface 28 includes a display screen that displays information allowing the user of the MFP 13E to interact with the MFP 13E. The display screen can be any of various conventional displays (such as a liquid crystal display, a plasma display device, a cathode ray tube display, etc.), but is preferably equipped with a touch sensitive display (for example, liquid crystal display), and configured to provide a GUI (graphical user interface) based on information input by an operator of the MFP, so as to allow the operator to conveniently take advantage of the services provided by the system. The display screen does not need to be integral with, or embedded in, a housing of the MFP, but may simply be coupled to the MFP by either a wire or a wireless connection. The user interface 28 may include keys and/or buttons (such as graphical keys or buttons, or other graphical elements, of a GUI on a touchscreen display) for inputting information or requesting various operations. Alternatively, the user interface 28 and the display screen may be operated by a keyboard, a mouse, a remote control, voice recognition, or eye-movement tracking, or a combination thereof.

Since the MFP 13E is typically shared by a number of users, and is typically stationed in a common area, the MFP preferably prompt the user to supply authentication information, such as user name (or other user or group information), password, access code, etc. The authentication information can be compared to data stored in the user management table 26 to confirm that the user is authorized to use the MFP. The authentication information may also be stored for the session and automatically supplied if access to other devices through the network 9 requires it. On the other hand, such other devices may prompt the user to supply other authentication information through the user interface.

Another way for authenticating a user is for a user to swipe an access card through the card reader 25. Such access card can include user identification information, as well as account information to enable the management server to identify and authenticate the user, determine any credits remaining in the user (or group) account and allow such information to be displayed at the MFP upon request of the user.

Other methods of authentication may also be used. For example, the multi-function device may be equipped with one or more biometrics means (such as comparing fingerprints, palm prints, voice or speech, retinas or irises, facial expressions or features, signature, etc.).

Printer engine 22, scanner engine 23, network interface 24 and card reader 25 are otherwise conventional, and therefore, a detailed description of such conventional aspects are omitted in the interest of clarity and brevity (so as not to mask the novel aspects of the subject matter of this disclosure).

Figure 3:
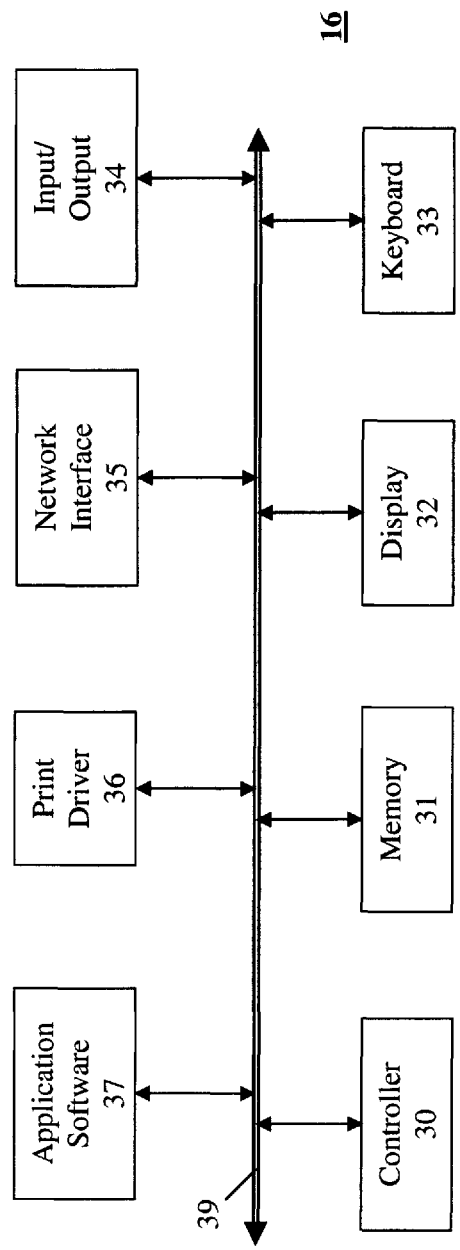
FIG. 3 shows a block diagram illustrating an example of a personal computer, such as can be used in the system of FIG. 1E.

An example of a computer that can be used as the personal computer 16 is shown schematically in FIG. 3. In FIG. 3, the computer 16 includes a controller (or central processing unit) 30 that communicates with a number of other devices, including memory 31, display 32, keyboard (and/or keypad) 33, other input/output (such as mouse, touchpad, stylus, microphone and/or speaker with voice/speech interface and/or recognition software, etc.) 34, network interface 35, print driver 36 and application software 37, by way of a system bus 39. Memory 31 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.]. A network interface 35 provides a connection (for example, by way of an Ethernet connection or other network connection which supports any desired network protocol such as, but not limited to TCP/IP, IPX, IPX/SPX, or NetBEUI) to network 9. Print driver 36 and application software 37 are shown as components connected to the system bus 39, but in practice are typically stored in storage media such as a hard disk or portable media, and/or received through the network 9, and loaded into memory 31 as the need arises.

The computer is otherwise (for example, additional aspects or components thereof) conventional, and therefore such aspects or components are not discussed in detail herein in the interest of clarity. Such aspects and components are discussed, for example, in "How Computers Work", by Ron White (Que Corporation 1999), and "How Networks Work", by Frank J. Derfler, Jr. and Les Freed (Que Corporation 2000), the entire content of each of which are incorporated herein by reference.

Figure 4:
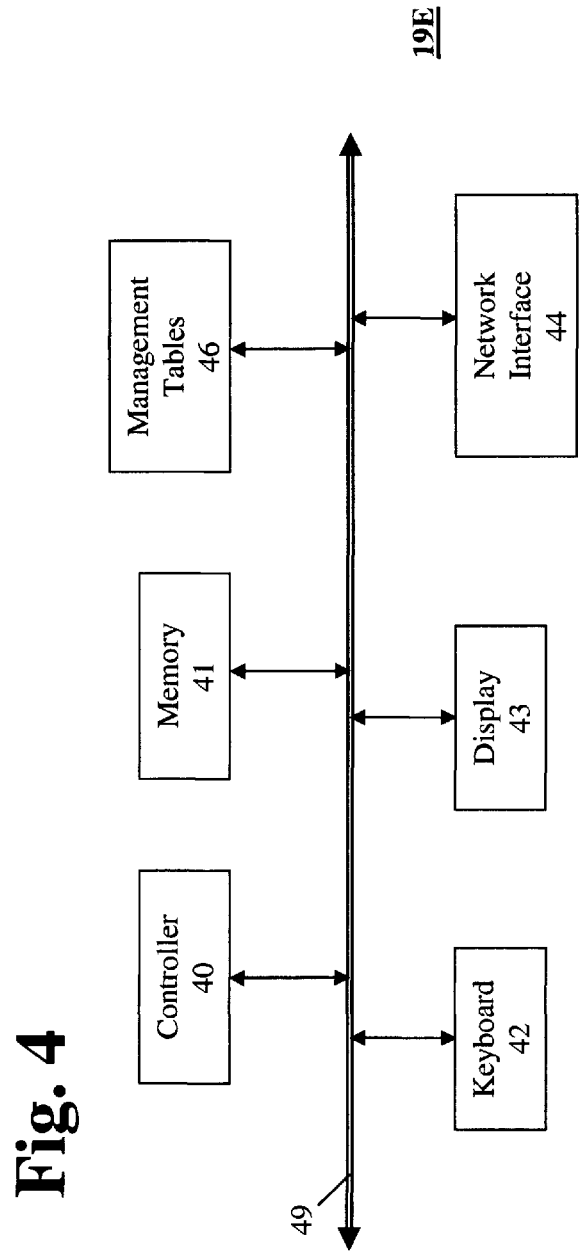
FIG. 4 shows a block diagram illustrating an example of a management server, such as can be used in the system of FIG. 1E.
Figure 8:
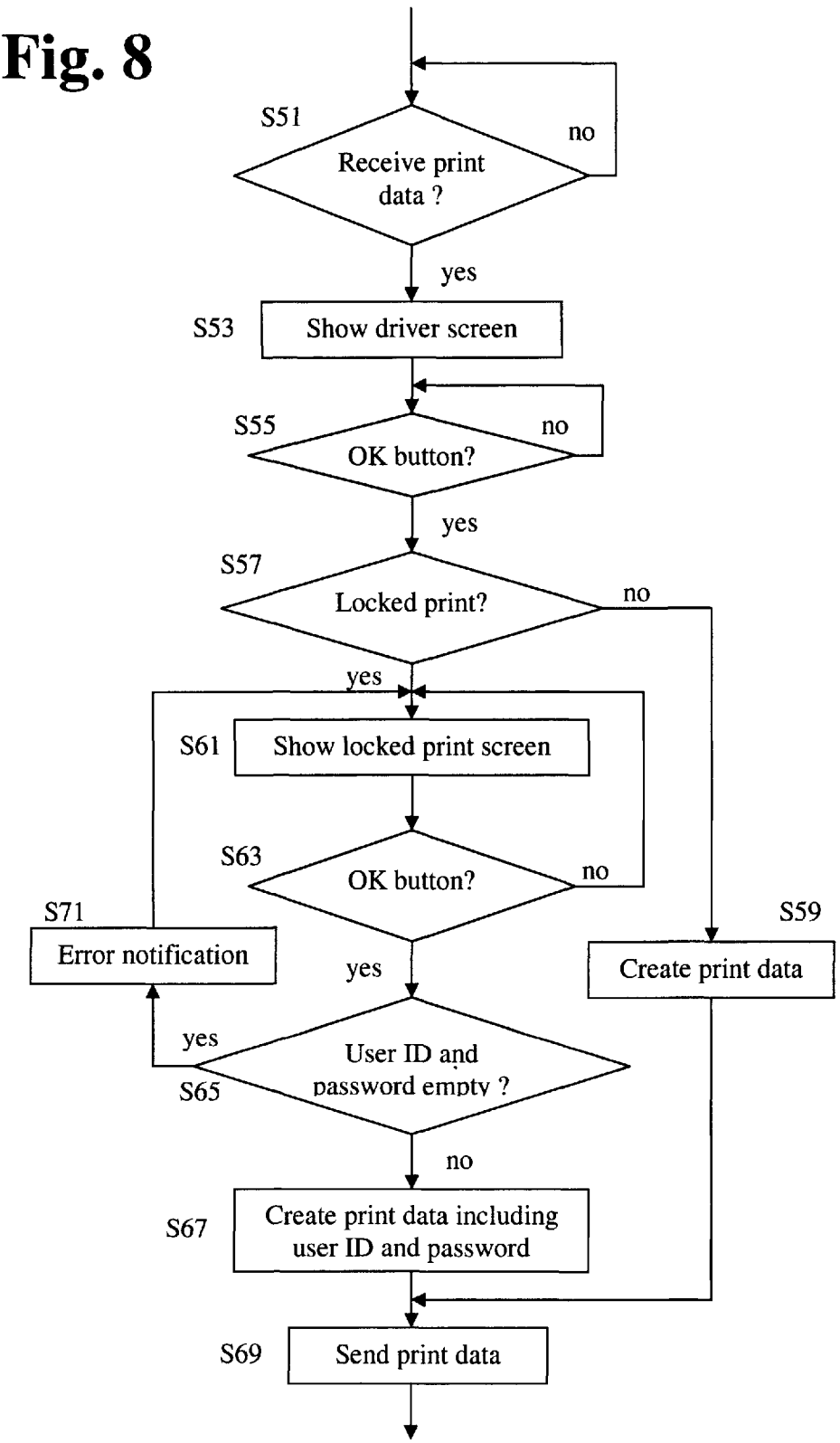
FIG. 8 shows a flow chart illustrating an example of a process performed by a print driver on the personal computer of FIG. 3.

FIG. 4 shows an exemplary constitution of a server that can be used as the management server 19E. In FIG. 4, the management server 19E includes a controller (or central processing unit) 40 that communicates with a number of other devices, including memory 41, keyboard 42, display 43, network interface 44 and management tables 46, by way of a system bus 49.

The controller 40 executing program code instructions controls the management server 19E to maintain one or more management tables 46 storing various information, such as information for print jobs from specific users and/or from specific information terminals. The information can include an account management table (for example, as shown in FIG. 6) to store information indicating an account remaining (for example, credit balance available for additional printing) for each user (and/or group). The account server may optionally maintain other accounting information regarding print jobs submitted by the user and/or from the information terminal, such as a count of pages (or number of jobs) from a specific user and/or from a specific information terminal on a specific printing device over a predetermined period of time (for example, since the last page count reset, since the beginning of the accounting period, etc.), as well as other details such as color printing, paper size, paper type, duplex printing, print resolution, PDL, print application, departmental code, budget code, date and time, confidentiality, data size, user name, etc.

For example, when a print job communication is received from an information terminal, the account server can extract network address information from the print job communication received from the information terminal (with the network address identifying the information terminal from which the print job was received), and can determine a print job page count (for example, by monitoring the printing of the print job to determine the number of pages printed for the print job, by communication with the printing device, by extracting information regarding number of pages in the print job from the print job file, etc.), as well as other information. The account server can utilize the network address information to retrieve the appropriate count of pages printed by the information terminal over the predetermined period of time, and after the print job is completed, updates the count with a print job page count.

The information maintained by the account server may be retrieved on demand by the user (or a manager, an administrator, etc.,) and/or from the information terminal (or another terminal). For example, an information request may entail determining a number of color-printed pages over a specific time period (such as the current calendar year, month, etc.) by the user, user's department, etc. As another example, the user may desire to know a remaining balance of budgeted funds for printing by the user, such as can be determined by reference to the account management table.

In addition, the information maintained by the account server may be utilized by the above-mentioned cost calculator to determine the cost of a newly received print job. The cost calculator can access a cost information table (for example, as shown in FIG. 7) to retrieve information indicating per-page costs of color printing and black-and-white printing. The cost information table can be maintained by the management server 19E or by the printing device (such as MFP 13E).

The per-page cost information in the cost information table may merely represent default cost that is used to start the cost calculation which adjusts the default cost based on particulars of the print job (for example, duplex printing, print resolution, PDL, print application, etc.) and/or other circumstances or factors (for example, date and time, confidentiality, etc.). Such particulars, circumstances or factors may be embodied in a scaling factor that is multiplied with the default cost to adjust a cost upwards or downwards.

For example, it may be more costly for a user to color print a job if the user has already exceeded a threshold number of color-printed pages within a specific time period. As another example, if a specific printing device has already exceeded a threshold number of color-printed pages within a specific time period, the user may be enticed to print a job using black-and-white printing, by lowering the cost of black-and-white printing (and/or increasing the cost of color printing) on the printing device for the user. In another example, the cost may be adjusted based on the recording medium (for example, medium type, size, etc.).

The subject matter of this disclosure can be embodied essentially in software. In such a scenario, the subject matter can be embodied in a print driver or application, which is installed on or supplied to an information terminal. The print driver or application can be configured to present output options to the user, and allow the user to select desired options.

In additional examples, the subject matter of this disclosure can embody hardware, such as an MFP, and software (such as for supplying a service) hosted on the MFP. In such instances, a computing device can access the service on the MFP, select job settings, and submit job files via the service to the MFP. The service can remember the user, user preferences and previously used job settings. An authentication and encryption processes (as well as other processes) are preferably provided to protect the user data.

The subject matter of this disclosure, in additional examples, can include a server and a service hosted on the server. For example, the server and service may be part of a printing system including one or more printer or printing devices (alternatively, the printing devices may simply be printers available through the network, that is, not managed by the server). In any event, the user in such examples can use the computing device to access the service hosted on the server, select output device and job settings, and submit a print job file directly from the computing device, or via another server (for example, file server or content management system). Such other server or content management system can be part of the printing system or simply be available through the network. It should be appreciated from the examples herein that the printing system, the files, and the user do not all have to be within a closed system or on the same network.

A process for submitting a print job from a computer (such as illustrated in FIG. 3) configured with a printer driver (such as print driver 36 in computer 16 of FIG. 3) will be explained with reference to FIGS. 8-11, in accordance with an exemplary embodiment.

Figure 9:
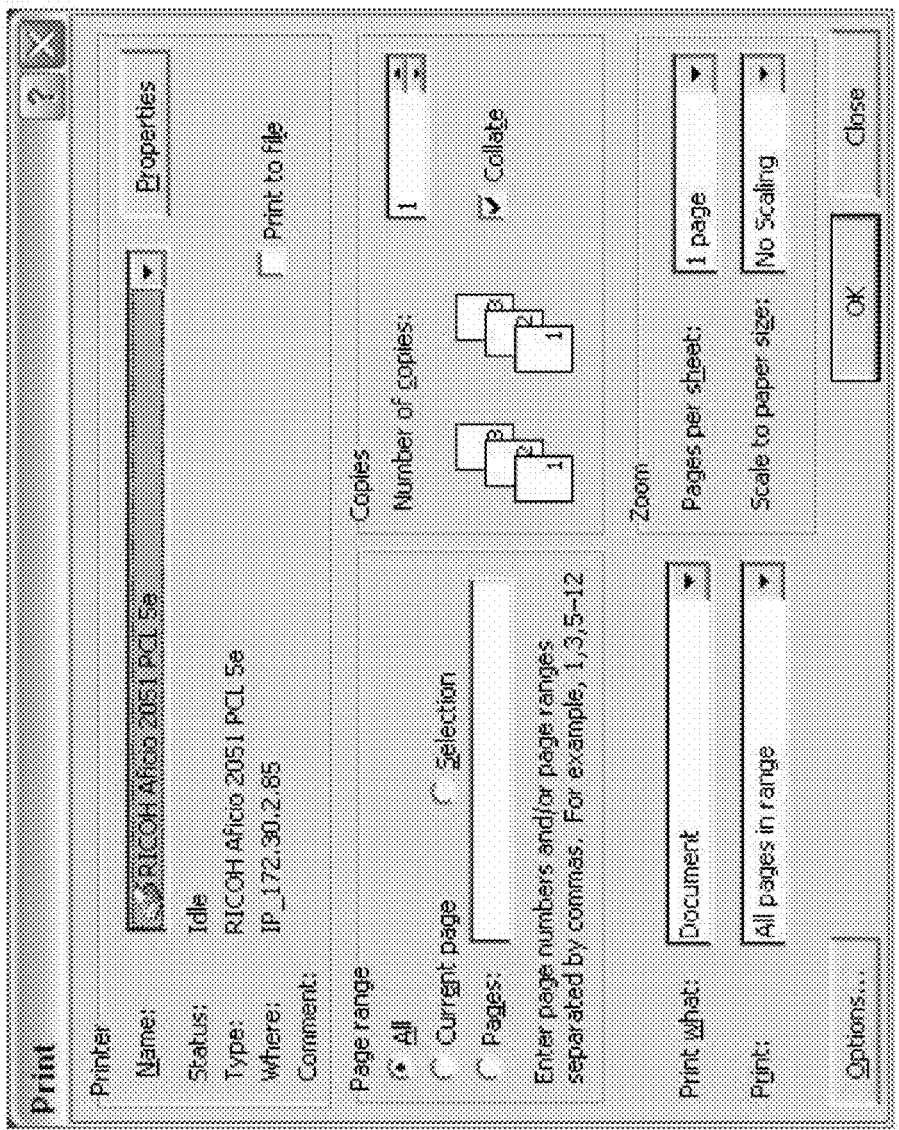
FIG. 9 shows an example of a user interface screen displayed in the process of FIG. 8 when a print function is invoked by a user.

The computer checks whether a print function has been invoked (S51), such as from an application software. This check is repeated until a print function is triggered (S51, yes). When a user selects "print" in an application, the computer causes a print screen, such as shown in FIG. 9, to appear on the computer display (S53).

In many instances, the user will have a choice of printers or print drivers that can be used. The default choice is initially shown next to "Name:" in FIG. 9. A drop-down menu of choices can be displayed when the user clicks on (that is, uses a pointing device to select) "▼" next to the displayed choice. The user can change settings of the printer or print driver by clicking on the [Properties] button located next to the selected printer/driver name.

Figure 10:
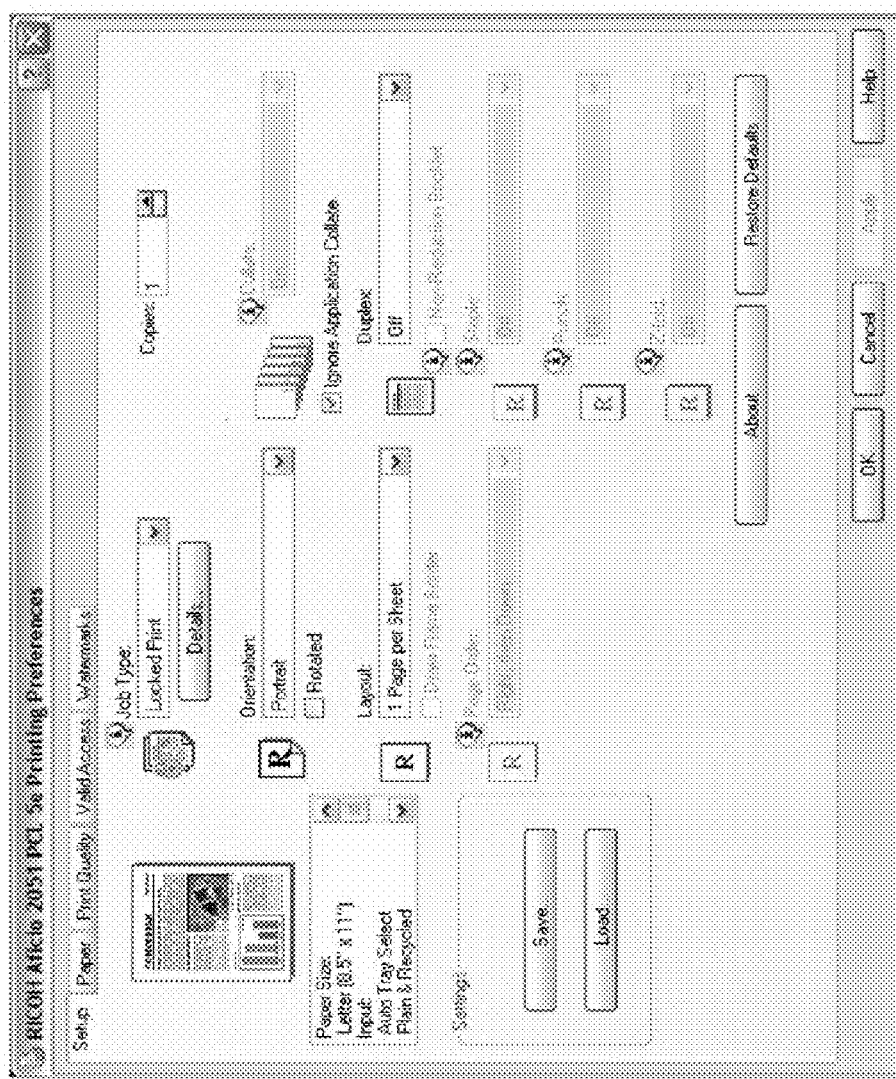
FIG. 10 shows an example of a user interface screen displayed in the process of FIG. 8 when locked print is selected.
Figure 11:
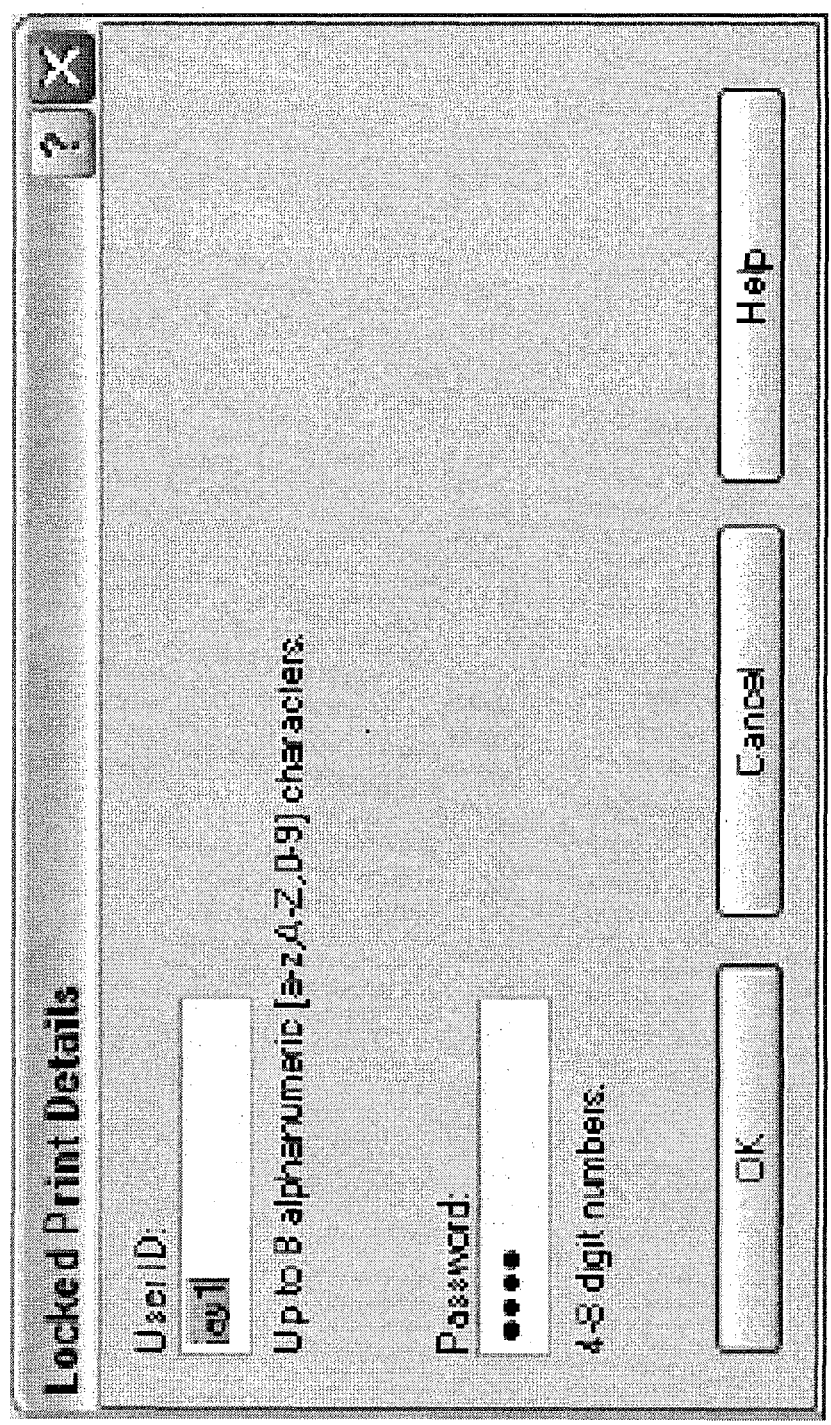
FIG. 11 shows an example of a user interface screen displayed in the process of FIG. 8 for authentication when locked print is selected.

When the user clicks on the [Properties] button, a user interface screen, such as shown in FIG. 10, can be displayed to shown the current job settings (for example, paper size and type, input tray, page orientation and layout, number of copies, duplex printing, print mode, etc.) and allow the user to change settings, if necessary. For example, the user can enable locked print to securely submit a print job, without output of the printout by the printing device until the user (or someone else) enters authentication data at the printing device. Such locked mode is particularly useful, for example, when many users share a printing device, when a user prints to a remote printing device, when the print job contains sensitive or confidential information, etc.

When the user clicks on the [OK] button (S55, yes), the computer checks whether locked print has been enabled (S57). If locked print has not been enabled (S57, no), the print driver processes the print data for the print job (S59) and then transmits the print job to the printing device (S69).

On the other hand, if locked print has been enabled (S57, yes), a locked print screen (for example, FIG. 11) is displayed (S61) to allow the user to supply authentication information (for example, user ID and password). If the user clicks the [OK] button (S63, yes) without having entered authentication information (S65, yes), an error notification is displayed (S71) and the locked print screen (FIG. 11) is displayed again (S61). On the other hand, if the [OK] button is clicked (S63, yes) and authentication information was entered (S65, no), the authentication information is processed along with the print data to generate print job data (S67), and then the print job data (for example, with mode information indicating locked print in a header portion of the print job data) is transmitted to the printing device (S69).

Figure 12:
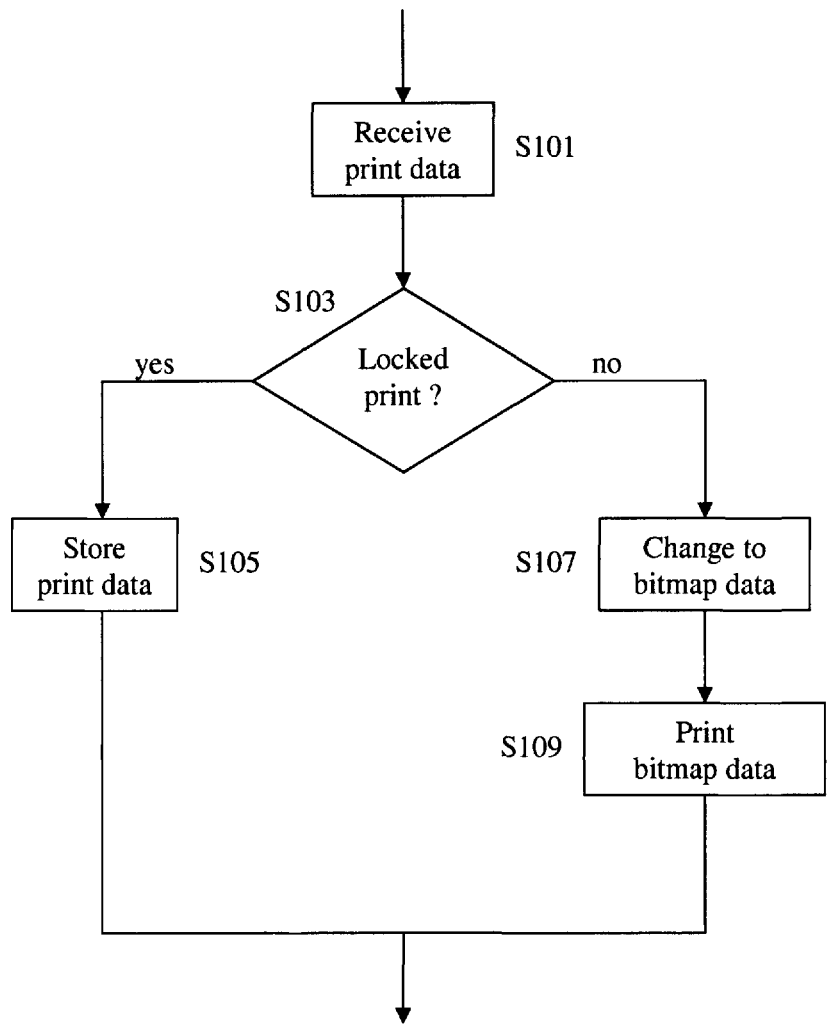
FIG. 12 shows a flow chart illustrating an example of a process performed by the multi-function device of FIG. 2 when print data is received from the personal computer of FIG. 3.
Figure 13A:
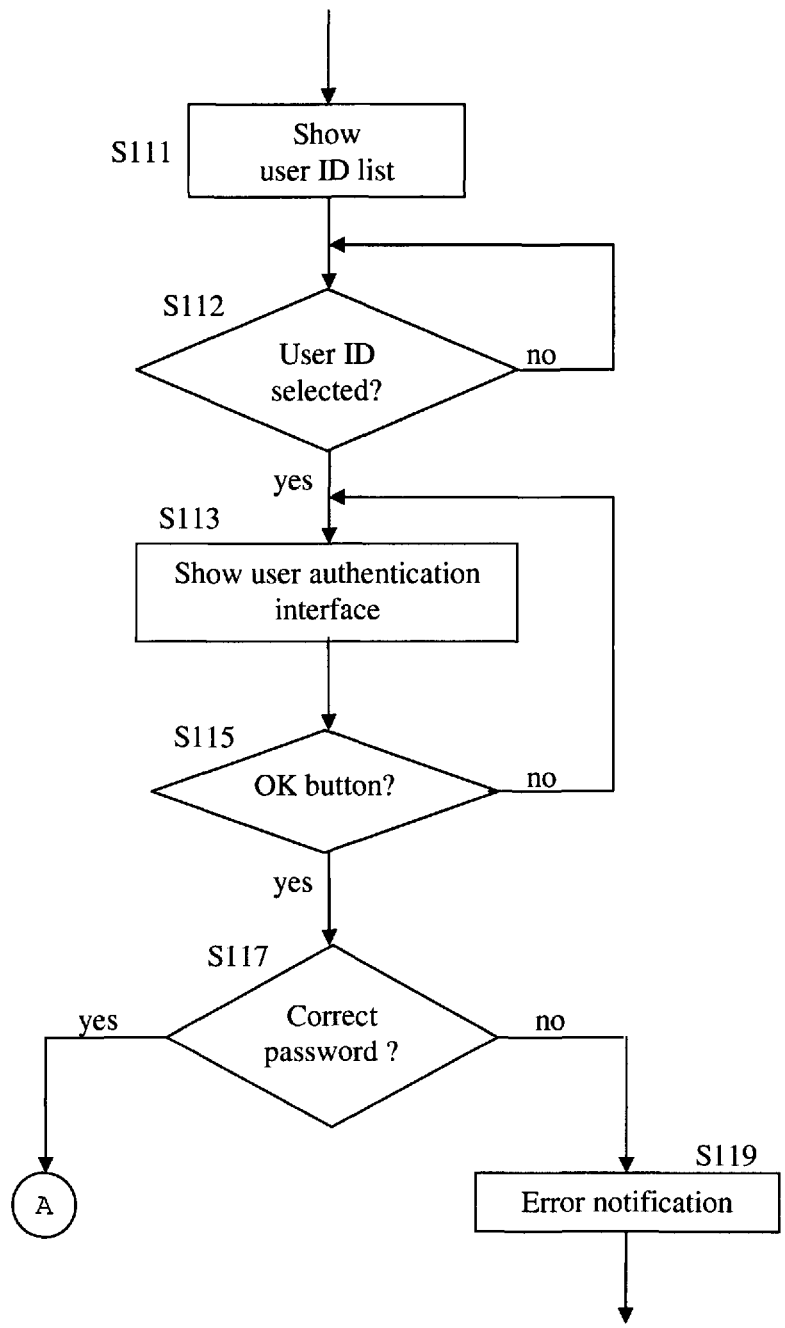
FIGS. 13A and 13B show a flow chart illustrating an example of a process performed by the multi-function device of FIG. 2 when Release Print Jobs button is pressed.
Figure 13B:
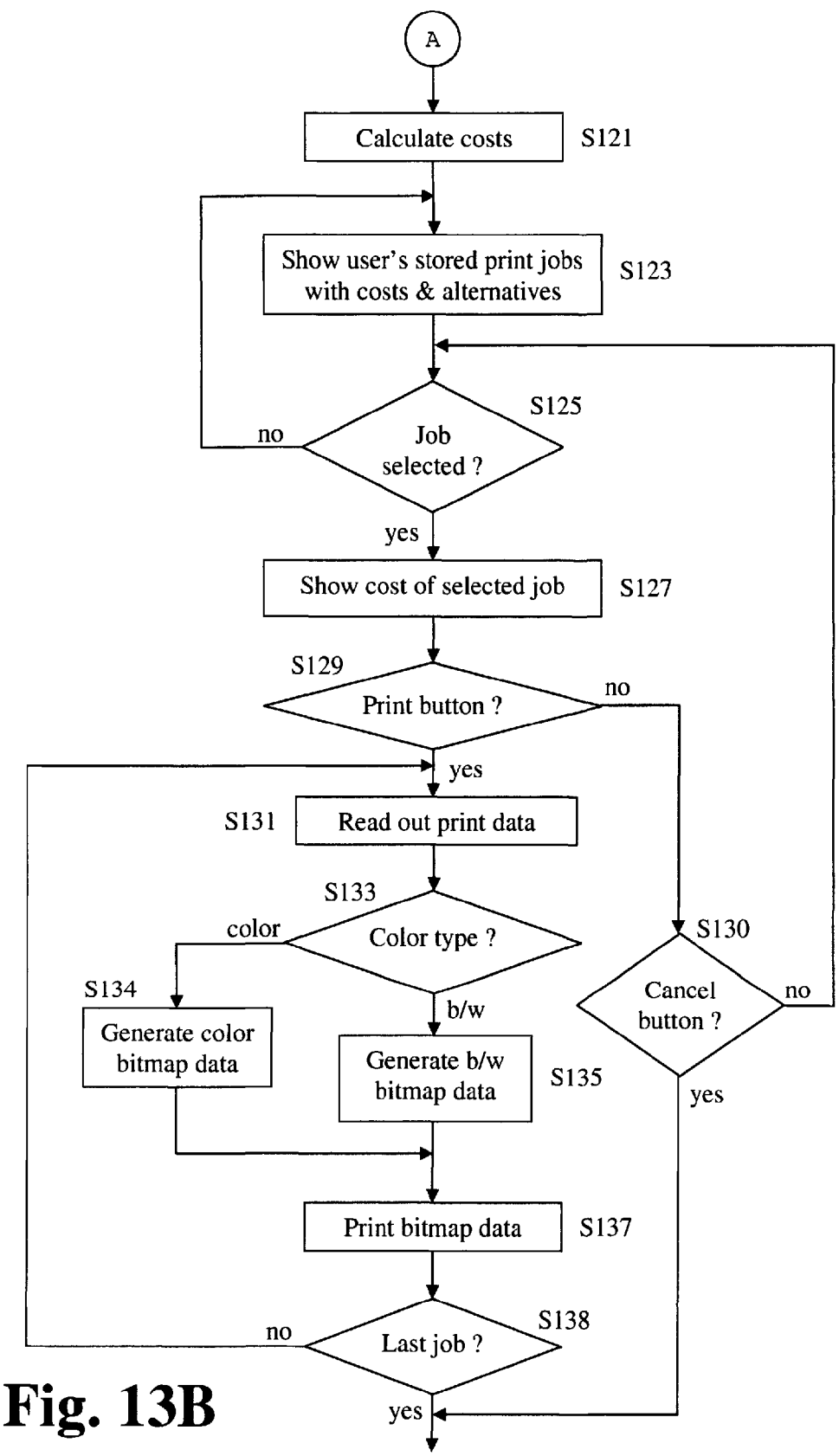

A method for processing print job data received at a printing device having locked print as a print mode, in accordance with an exemplary embodiment (FIG. 12), is described below. When print job data is received by the printing device (S101) from an information terminal configured with a print driver, such as described above in connection with FIG. 8, a print controller of the printing device (for example, controller 20 of MFP 13E in FIG. 2) determines whether the received print job data is for locked print (S103), such as by considering mode information in the header portion of the print data. If the received print job data is for locked print (S103, yes), the print job data is stored as a print job on the printing device (S105), awaiting selection following user authentication.

On the other hand, if the received print job data is not for locked print (S103, no), the print data is converted (for example, by converter 27 shown in FIG. 2), if necessary, into a form (such as bitmap data) suitable for printing by the printing device (S107) and then the print job is printed by the printing device (S109). For example, the print data may include a stream of page description language elements, and the converter 27 converts the stream of page description language elements into bitmap image data corresponding to the print data. As another example, the converter 27 converts color image print data into black-and-white image print data if black-and-white printing of the job is desired. Other types of conversion may be performed in appropriate circumstances.

A process for selecting a print job stored at a printing device having a locked print capability, in an exemplary embodiment, is described below with reference to FIGS. 13A through 20.

Figure 14:
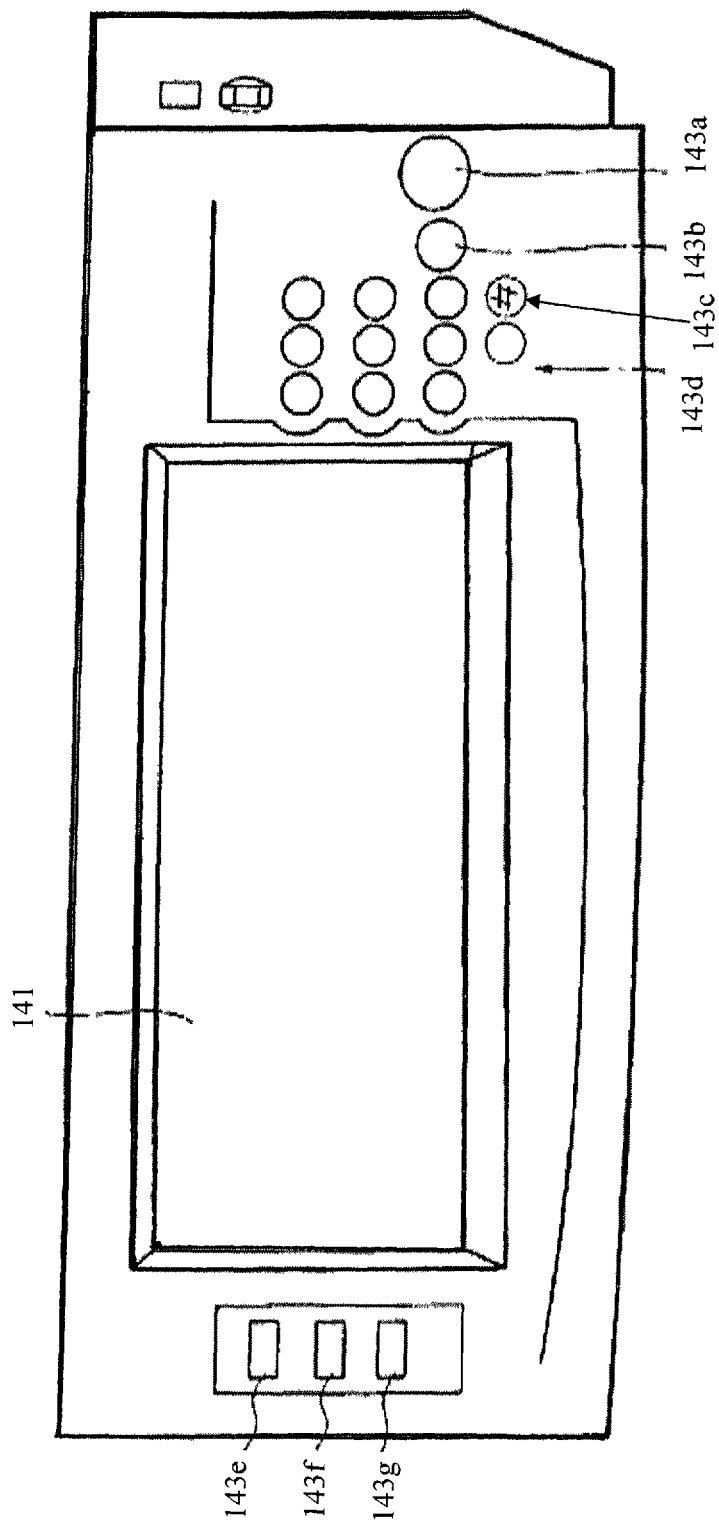
FIG. 14 shows a graphical representation of an operation panel in the multi-function device of FIG. 2.

The printing device can be the multi-function device shown in FIG. 2, and preferably has an operation panel, such as shown in the example of FIG. 14, that includes a touchscreen (for example, 141 in FIG. 14) and user-operable keys or buttons (for example, in FIG. 14, start key 143a, clear/stop key 143b, enter key 143c, numeric keys 143d, copy function key 143e, server function key 143f, print function key 143g, etc.). The touchscreen technology is conventional and therefore not explained in detail herein in the interest of brevity and clarity with respect to the subject matter and features herein believed to be inventive.

Figure 15:
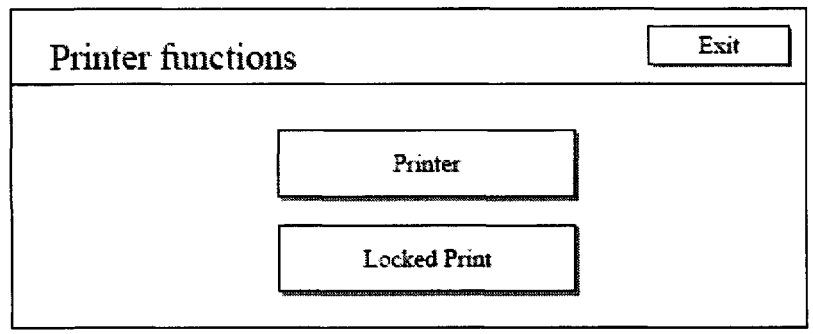
FIG. 15 shows an example of a user interface screen displayed on a display of the operation panel of FIG. 14 when a printer function key is pressed.
Figure 16:
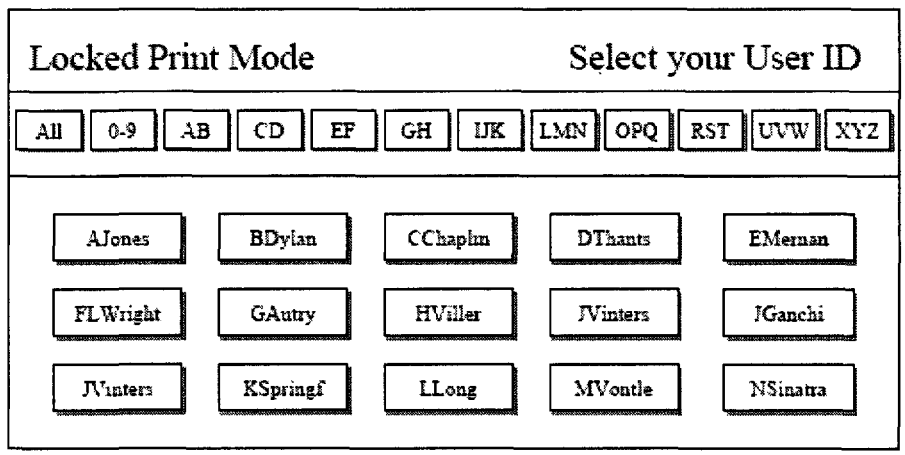
FIG. 16 shows an example of a user interface screen displayed on a display of the operation panel of FIG. 14 when a locked print is selected.

The touchscreen can initially display a printer function screen, such as shown in FIG. 15. The user can press [Locked Print] to access locked print jobs submitted by the user to the printing device, or choose other printer functions. When [Locked Print] is pressed, a User ID selection screen, such as shown in FIG. 16, is displayed (S111). In the example shown in FIG. 16, a plurality of soft User ID buttons (AJones, BDylan, . . . NSinatra) are shown in the selection screen. In addition, a plurality of soft grouping buttons (All, 0-9, AB, . . . XYZ) are provided in the example of FIG. 16. Other user interface features can be included in the selection screen, such as scroll bars, menus, etc.

Figure 17:
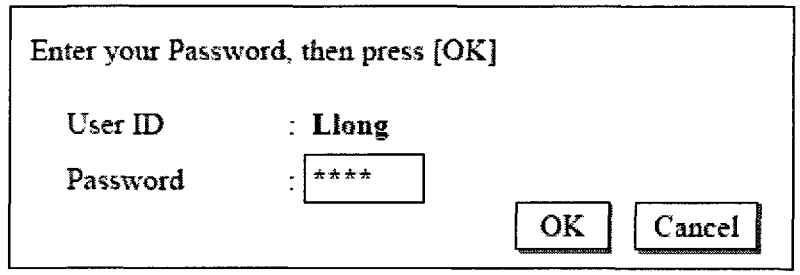
FIG. 17 shows an example of a user interface screen displayed on a display of the operation panel of FIG. 14 for authentication when a user ID on the user interface screen of FIG. 16 is selected.

When the user presses one of the User ID buttons (S112, yes), an authentication screen, such as shown in FIG. 17, is displayed to prompt the user to enter a password (S113). When the [OK] button is pressed (S115, yes), the password is authenticated (S117). If the password is not correct (S117, no), an error notification is displayed (S119). On the other hand, if the password is correct (S117, yes), the process proceeds to calculate costs (and alternatives) of all stored print jobs associated with the authenticated user ID (S121).

Figure 18:
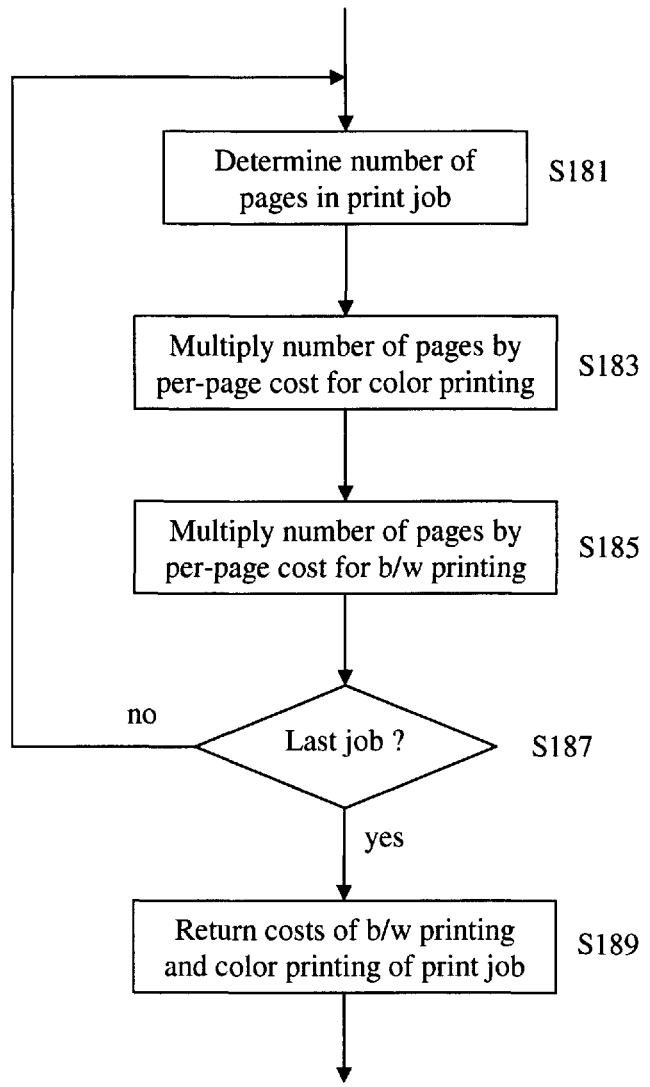
FIG. 18 shows a flow chart illustrating an example of a process for determining a number of pages in a print job.

An example of a method for calculating costs wherein the print job is comprised of color image print data is explained below with reference to FIG. 18. The number of pages in the print job is determined (S181), for example, by analyzing the print data. As an example, if the print data is PCL (Printer Control Language) data or PJL (Printer Job Language) data, the analysis can entail counting the number of instances of Page End command in the data. As another example, if the print data is PDF (Portable Document Format) data, the number of pages can be determined from the page configuration information indicating total pages in each specific section of the data.

Next, the number of pages in the print job is multiplied by the per-page cost of color printing to determine the cost color printing the print job (S183). Likewise, the cost of black-and-white printing the print job is determined by multiplying the number of pages in the print job by the per-page cost of black-and-white printing (S185). Such process (S181, S183 and S185) is repeated (S187, no) until the costs of the last job are determined (S187, yes). The costs of color printing and black-and-white printing for the jobs are returned (S189).

The returned costs of color printing and black-and-white printing the user's stored print jobs are displayed (S123). Exemplary displays of costs are shown in FIGS. 19 and 20. In the example of FIG. 19, the user has four stored print jobs, and the number of pages, color type and costs of each job are displayed for the user's consideration. Two jobs (Budget.xls and xyz01.pdf) are black-and-white print data and no alternatives are provided. For the two color image data print jobs (IS241.pdf and abcd.doc), the color printing cost is provided, and in addition the black-and-white printing cost is provided as an alternative.

If any jobs are selected (S125, yes), the total number of pages and the total cost of the selected jobs are tallied and shown (S127). In the example of FIG. 19, the user selected the job xyz01.pdf for printing and selected color printing of the job abcd.doc, and "0377" is displayed as the total pages and $238.50 is the tally of costs of the selected jobs. The user's credit balance ($200.00) is not debited until after the user presses the [Print] button (S129, yes).

On the other hand, the user can un-select a selection and/or in the case of a color data print job, select the alternative in place of selection of color printing. FIG. 20 shows an instance in which after the user selects color printing of the abcd.doc job, the selection is changed to the alternative (that is, black-and-white printing of the print job), and the tally is automatically updated.

The user can exit the selection process by pressing the [Cancel] button (S130, yes).

When the user presses the [Print] button (S129, yes), the stored print data for each selected print job is read out in turn (S131). The retrieved print data is converted (for example, by converter 27 shown in FIG. 2), if necessary, into a form (such as bitmap data) suitable for printing by the printing device.

In instances in which color image print data is to be color printed (S133, color), the retrieved print data may be converted into color bitmap data (S134). The methodology used for converting color image print data of another format into color bitmap data can be conventional and therefore not explained in detail herein in the interest of brevity and clarity with respect to the subject matter and features herein believed to be inventive.

On the other hand, in instances in which black-and-white printing of color image print job is selected (S133, b/w), the color image print data is converted into black-and white bitmap data (S135). Such conversion may entail converting RGB color data, as the stored color image print data, into grayscale data. For example, the following formula may be used:

$$gray=0.3*red+0.59*green+0.11*blue.$$

Thus, 24-bit color image data (wherein the range of value for each of red, green and blue is 0 to 255) can be converted to a gray value within a range of 0 to 255.

In any event, the converted data is printed (S137), and the conversion and printing steps (S131, S133, S134, S135, S137) are repeated for each selected job (S139, no) until after the last selected job is printed (S139, yes).

The examples and exemplary embodiments described above are illustrative, and many variations can be introduced on these embodiments without departing from the spirit of the disclosure or from the scope of the appended claims.

In the exemplary embodiment described above the alternative to color printing of a color image print job is black-and-white printing. However, the alternative may be printing of the print job, either color or black-and-white, with other variations. For example, an alternative to printing a print job in the standard manner is to print the job in duplex mode (to save paper), or on A4-paper (when supply of letter-size paper is low), as draft-quality document (to save ink or toner), at a low-use time (when the print queue is long), etc.

In addition, elements and/or features of different examples and illustrative embodiments may be combined with each other and/or substituted for each other within the scope of this disclosure and appended claims.

What is claimed is:

1. An apparatus for submitting a print job to a specific printing device, said apparatus comprising:
   a cost calculator configured to calculate for each one of a plurality of print jobs:
      a first cost of printing color image print data corresponding to the respective print job, and which is stored in a storage unit, as a color image; and
      a second cost of printing the stored print data corresponding to the respective print job as a black-and-white image; and
   a print user interface configured to
      display simultaneously, for each particular print job amongst the plurality of print jobs, (i) the first cost calculated by the cost calculator for printing the particular print job as a color image and (ii) the second cost calculated by the cost calculator for printing the particular print job as a black-and-white image, for selection by a user, and
      indicate a total cost of printing a specified subset of the plurality of print jobs, calculated based on a combination of one or more separate user selections of one of the first cost, for color print, and the second cost, for black-and-white print, made particularly for each specific print job in the specified subset of the plurality of print jobs, and
      process the print data for each print job in the specified subset, for printing by said printing device, as one of the color image and the black-and-white image, corresponding to the combination of one or more user selections of one of the first cost and the second cost for each print job in the specified subset.

2. The apparatus as claimed in claim 1, wherein the cost calculator calculates the first cost and the second cost for each one of the plurality of print jobs, based on per-page cost and information indicating a number of pages corresponding to the print data of the respective print job.

3. The apparatus as claimed in claim 1, wherein the print data for each one of the plurality of print jobs is represented by a stream of page description language elements, and the apparatus further comprises a converter configured to convert the stream of page description language elements into bitmap image data corresponding to the print data for the respective print job.

4. The apparatus as claimed in claim 3, wherein the converter further converts the color image print data for a given print job in the specified subset into black-and-white image print data, if the second cost is selected by user with respect to the given print job.

5. The apparatus as claimed in claim 1, wherein the stored print data for each one of the plurality of print jobs includes information indicating a number of pages represented by the print data.

6. The apparatus as claimed in claim 1, wherein the stored print data for each one of the plurality of print jobs is represented by bitmap image data.

7. The apparatus as claimed in claim 1, further comprising a converter configured to convert the color image print data for a given print job in the specified subset into black-andwhite image print data, if the second cost is selected by user with respect to the given print job.

8. The apparatus as claimed in claim 1, wherein said cost calculator and said print user interface are comprised in a print application provided through a network to an information terminal enabling the user to request from said information terminal to print said print job on said specific printing device.

9. The apparatus as claimed in claim 1, wherein the print user interface provides means to specify job settings for each one of the plurality of print jobs, and said first and second costs are calculated based on said job settings for the respective print job.

10. The apparatus as claimed in claim 9, further comprising a cost information table, wherein at least one of said first and second costs for each one of the plurality of print jobs is calculated based on a product of (i) a predetermined cost corresponding to cost information in said cost information table and (ii) a scaling factor determined based on said job settings for the respective print job.

11. The apparatus as claimed in claim 1, further comprising an account management table maintaining a remaining account balance for each of a plurality of users, wherein after the print data for a given one of the plurality of print jobs is processed for printing by the printing device, the remaining account balance of the user in the account management table is updated according to the selected cost corresponding to the given print job.

12. The apparatus as claimed in claim 1, wherein the print user interface simultaneously displays:
(i) a remaining account balance of the user, and
(ii) said total cost of printing the specified subset of the plurality of print jobs, calculated based on the combination of one or more user selections of one of the first cost and the second cost made particularly for each specific print job in the specified subset of the plurality of print jobs.

13. The apparatus as claimed in claim 1, wherein the specified subset of the plurality of print jobs includes two or more of the plurality of print jobs.

14. A printing system comprising: one or more information terminals, each terminal being configured to include
a storage unit configured to store color image print data for each one of a plurality of print jobs,
a cost calculator configured to calculate for each one of the plurality of print jobs:
a first cost of printing the print data stored in the storage unit and corresponding to the respective print job as a color image; and
a second cost of printing the print data corresponding to the respective print job as a black-and-white image, and
a user interface configured to
display simultaneously, for each particular print job amongst the plurality of print jobs, (i) the first cost calculated by the cost calculator for printing the particular print job as a color image and (ii) the second cost calculated by the cost calculator for printing the particular print job as a black-and-white image, for selection by a user, and
indicate a total cost of printing a specified subset of the plurality of print jobs, calculated based on a combination of one or more separate user selections of one of the first cost, for color print, and the second cost, for black-and-white print, made particularly for each specific print job in the specified subset of the plurality of print jobs; and
a printing unit configured to print the print data for each print job in the specified subset as one of the color image and the black-and-white image, corresponding to the combination of one or more user selections of one of the first cost and the second cost for each print job in the specified subset.

15. A method for submitting a print job to a specific printing device, said method comprising the steps of:
(a) calculating, for each one of a plurality of print jobs, a first cost of printing specific color image print data corresponding to the respective print job as a color image, and a second cost of printing the print data corresponding to the respective print job as a black-and-white image;
(b) displaying simultaneously, for each particular print job amongst the plurality of print jobs, (i) the first cost calculated in (a) for printing the particular print job as a color image and (ii) the second cost calculated in (a) for printing the particular print job as a black-and-white image, for selection by a user;
(c) indicating a total cost of printing a specified subset of the plurality of print jobs, calculated based on a combination of one or more separate user selections of one of the first cost, for color print, and the second cost, for black-and-white print, made particularly for each specific print job in the specified subset of the plurality of print jobs; and
(d) printing the print data for each print job in the specified subset as one of the color image and the black-and-white image, corresponding to the combination of one or more user selections of one of the first cost and the second cost in (b) for each print job in the specified subset.

16. The method as claimed in claim 15, wherein the print data for each one of the plurality of print jobs is represented by a stream of page description language elements, and the method further comprises the step of:
converting the stream of page description language elements into bitmap image data corresponding to the print data for the respective print job.

17. The method as claimed in claim 16, further comprising the step of:
converting the color image print data for a given print job in the specified subset into black-and-white image print data, if the second cost is selected by the user with respect to the given print job.

18. The method as claimed in claim 15, further comprising:
storing the color image print data for each one of the plurality of print jobs in a storage unit,
wherein the stored color image print data for each one of the plurality of print jobs is represented by bitmap image data.

19. The method as claimed in claim 15, further comprising:
storing the color image print data for each one of the plurality of print jobs in a storage unit,
wherein the stored color image print data for each one of the plurality of print jobs includes information indicating a number of pages represented by the print data.

20. The method as claimed in claim 15, further comprising:
converting the color image print data for a given print job in the specified subset into black-and-white image print data, if the second cost is selected by the user with respect to the given print job.

* * * * *